(12) United States Patent
Bertrand et al.

(10) Patent No.: US 8,851,359 B2
(45) Date of Patent: Oct. 7, 2014

(54) ASSEMBLY METHOD USING BRAZING

(75) Inventors: Bernard Bertrand, Manosque (FR);
Dominique Guilhem, Aix en Provence
(FR); Manfred Lipa, Rottach-Egern
(DE)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 13/395,244

(22) PCT Filed: Sep. 10, 2010

(86) PCT No.: PCT/EP2010/063323
§ 371 (c)(1),
(2), (4) Date: Apr. 5, 2012

(87) PCT Pub. No.: WO2011/029907
PCT Pub. Date: Mar. 17, 2011

(65) Prior Publication Data
US 2012/0217288 A1 Aug. 30, 2012

(30) Foreign Application Priority Data
Sep. 10, 2009 (FR) ..................................... 09 56219

(51) Int. Cl.
*B23K 31/02* (2006.01)
*B23K 3/08* (2006.01)
*B23K 1/008* (2006.01)

(52) U.S. Cl.
CPC ................. *B23K 1/008* (2013.01); *B23K 3/087* (2013.01)
USPC ................... 228/262.61; 228/212; 228/234.1; 228/235.1

(58) Field of Classification Search
USPC ............ 228/212, 262.6, 262.61, 234.1, 235.1
See application file for complete search history.

(56) References Cited

U.S. PATENT DOCUMENTS

| 1,687,696 | A | * | 10/1928 | Ricker et al. | ................. 228/44.3 |
| 3,047,710 | A | | 7/1962 | Rowe | |
| 3,093,104 | A | * | 6/1963 | Bukata | ......................... 228/44.3 |
| 3,202,792 | A | | 8/1965 | Bukata | |

(Continued)

FOREIGN PATENT DOCUMENTS

| DE | 44 12 792 A1 | 10/1995 |
| JP | 60-87968 | 5/1985 |

(Continued)

OTHER PUBLICATIONS

International Search Report as issued for PCT/EP2010/063323.

*Primary Examiner* — Devang R Patel
(74) *Attorney, Agent, or Firm* — Pillsbury Winthrop Shaw Pittman LLP

(57) ABSTRACT

A method for assembling at least two plates using a brazing process, the plates being separated by a filler material situated therebetween, includes placing the two plates, separated by the filler material, in a furnace; compressing the two plates separated by the filler material; controlling the temperature in the furnace according to a brazing cycle. The two plates separated by the filler material are compressed using a plurality of devices that can be pressurized using a fluid, the pressurizable devices being located in the furnace and being distributed over the surface of one of the two plates to which each pressurizable device applies a mechanical pressure that is remote-controlled as a function of the temperature in the furnace.

9 Claims, 2 Drawing Sheets

(56) References Cited

U.S. PATENT DOCUMENTS

Figure 1:
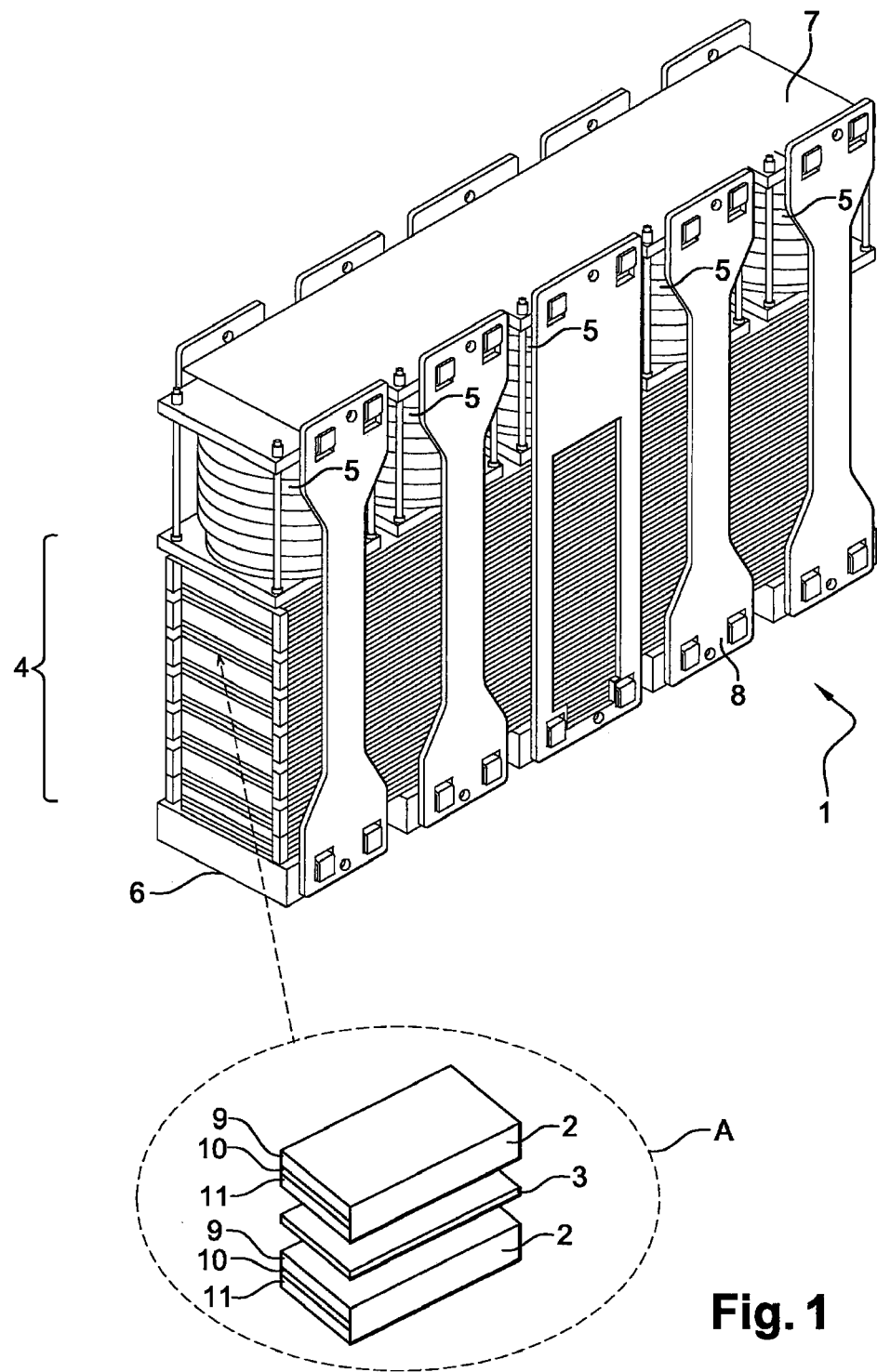

| | | | | |
|---|---|---|---|---|
| 3,971,875 | A | * | 7/1976 | Regalbuto ............... 219/243 |
| 4,480,165 | A | * | 10/1984 | Haushalter et al. ......... 219/85.1 |
| 5,914,064 | A | * | 6/1999 | Gillespie et al. ........... 219/615 |
| 7,270,258 | B2 | * | 9/2007 | Maki et al. ............... 228/234.1 |
| 7,441,688 | B2 | * | 10/2008 | Van Heerden et al. ....... 228/102 |
| 7,621,435 | B2 | * | 11/2009 | Vecchio et al. ............. 228/101 |

FOREIGN PATENT DOCUMENTS

| | | | |
|---|---|---|---|
| JP | 60087968 A | * | 5/1985 |
| WO | WO 02/066200 | | 8/2002 |
| WO | WO 2005/046921 | | 5/2005 |

* cited by examiner

ASSEMBLY METHOD USING BRAZING

CROSS REFERENCE TO RELATED APPLICATIONS

This application is the U.S. National Stage of PCT/EP2010/063323, filed Sep. 10, 2010, which in turn claims priority to French Patent Application No. 0956219, filed Sep. 10, 2009, the entire contents of all applications are incorporated herein by reference in their entireties.

The invention relates to a method for assembling by brazing. More particularly, the invention applies to a method for assembling by brazing large-size elements, for example elements intended to form radiofrequency antennae. By way of example, in the context of research on thermonuclear fusion controlled by magnetic confinement, being able to generate a direct current in tokamak plasma is necessary. One of the methods employed consists of injecting waves at a hybrid frequency of less than 3.7 GHz within the plasma, thus improving the conditions for creating nuclear fusion plasma. To do this; being able to inject, by using two radiofrequency antennae, a power of 8 MW over a duration of several hundred seconds or even 1000 seconds is envisaged.

The radiofrequency antennae comprise a series of waveguides, each waveguide being manufactured in the copper part of an alternating stack (bilayers or trilayers) of plates of copper and stainless steel, the plates forming the stack being interconnected by explosion.

The bimaterial plates resulting from this method for assembling by explosion are then stacked and interconnected by high-temperature brazing. During waveguide assembly, a plurality of trilayer plates is trapped within two bilayer endplates.

A brazing strip insert in a copper alloy is disposed between two bimaterial, bilayer or trilayer plates. The plate and brazing strip assembly is inserted in a vacuum furnace that may reach a temperature approaching 900° C.

When the furnace temperature reaches the brazing strip melting point, the bimaterial, bilayer or trilayer plates are mutually welded.

To ensure a uniform connection of plates during the brazing cycle, a uniform compression force must be exerted on the entire surface to be brazed in order to prevent any deformation of plates during the temperature rise. Such deformations would generate losses of contact of the plates with the brazing strip and would lead to brazing defects.

The most conventional assembly by brazing method consists of exerting mechanical pressure on the surface of the plates by means of stays. The stays used to exert the compression force on all of the plates during brazing strip melting are generally made of a molybdenum or Inconel™ type refractory material. These materials have interesting properties at high temperatures for this type of application (good mechanical characteristics, creep resistance). In addition, molybdenum has a relatively low thermal expansion coefficient compared to that of the stainless steel and copper used in making radiofrequency antennae. In this embodiment, one may take advantage of the expansion coefficient differences to ensure tightening of the hot plates. However, this solution utilizing stays presents certain disadvantages.

In fact, considering the mass of the assembly to be brazed, the brazing cycle may last several days or even a week. Such a connection is linked to the mass and geometry of the assembly to be brazed. It is calculated so as to limit the thermal gradients that may be produced inside the piece during the thermal brazing cycle.

The furnace temperature rise leads to thermal expansion and deformation of the assembly of bimaterial, bilayer or trilayer plates and stays. Even if the expansion coefficients of the different materials used are known, with more or less accuracy, certain discrepancies are observed, especially when hot. Therefore, it cannot be guaranteed that the mechanical pressure exerted on the bimaterial, bilayer or trilayer plate assembly is existing or sufficient for opposing all deformations that may appear during the brazing cycle. The brazing itself only requires a reduced pressure (0.05 bar) but this pressure is necessary, however. The importance of tightening (mechanical pressure of approximately 20 bar) aims above all to prevent any plate deformation that would drop this pressure locally. Such deformations are connected to the release of internal stresses and manufacturing tolerances and to flexions by the bimetal (copper/stainless steel) effect. These deformations, that take place during the brazing cycle, if they are not controlled, generate brazing defects, resulting in non-uniform connections between two adjacent plates. When high-frequency waves traverse the plates, this type of defect generates local losses. These losses are likely to create hot spots and electric arc strikes leading at the end to degradation of the plates.

In addition, when the brazing strip inserts change state, in other words when the furnace temperature approaches the melting point of the brazing strips, for example 780° C., a reduction in the thickness of the plate and brazing strip assembly is produced. This reduction generates a reduction in the mechanical pressure exerted on the plates, thus leading to brazing defects.

A second applicable method consists of exerting mechanical pressure by means of metal springs. At high temperatures, this type of implementation leads to a reduction in spring characteristics and a loss of tighter.

A third applicable method consists of exerting mechanical pressure by means of an inertial mass placed over the assembly of plates to be brazed, when possible. In our application, such an implementation requires the use of a large-size furnace so as to be able to introduce the large inertial mass therein. Because of this, such a method is only applicable for brazing small-size elements.

In this context, the invention aims to propose a method for assembling by brazing enabling brazes of higher quality than those obtained by the aforementioned methods to be surely produced.

For this purpose, the invention relates to a method for assembling at least two plates by brazing, said plates being separated by a filler material situated between said two plates, said method comprising the following steps:

placing the two plates separated by the filler material into a furnace;

compressing said two plates separated by said filler material;

controlling the temperature of the furnace according to a brazing cycle;

The method being characterized in that the two plates separated by a filler material are compressed by means of a device that is pressurizable by means of a fluid, the pressurizable device being located in the furnace and exerting a mechanical pressure on at least one part of the surface of one of the two plates, the mechanical pressure being remotely adjusted as a function of the temperature of the furnace.

Remote adjustment is understood to refer to the act of adjusting the mechanical pressure by means of a control system situated outside the furnace.

Thanks to the invention, an adjustable mechanical pressure, i.e., a mechanical pressure that is controllable remotely, is exerted via a pressurizable device by means of a fluid on at least one part of an assembly of plates to be brazed. The mechanical pressure is obtained under the effect of the deformation of the pressurizable device. This device that is pressurizable by means of a fluid is preferentially a bellows that is pressurizable by means of a gas. Such an implementation mitigates any increase or reduction in mechanical pressure that would be due to:

- significant differential expansions appearing during the brazing cycle between the plates to be brazed and possible compression means (stays, springs, etc.);
- subsidence of the plates and filler material, the subsidence may be generated by the change of state of the filler material when the furnace temperature approaches the melting point temperature of the filler material.

In addition, this mechanical pressure is adjusted as a function of the furnace temperature. The mechanical pressure exerted on the plates to be brazed may in particular be controlled and adjusted throughout the brazing cycle, even at high temperatures.

In addition to the principal characteristics that have just been mentioned in the previous paragraph, the assembly method by brazing according to the invention may present one or more of the additional characteristics below, considered individually or according to all technically feasible combinations:

- the pressurizable device is a bellows;
- said fluid is a gas;
- the mechanical pressure exerted on the surface of one of the two plates by the pressurizable device is obtained by the presence of an initial quantity of gas within the pressurizable device, the mechanical pressure exerted increasing with the temperature in the furnace and being adjusted by introducing or withdrawing gas with relation to the initial quantity within the pressurizable device;
- the brazing cycle comprises:
  - an increase in the temperature up to the brazing temperature, the temperature increase leading to an increase in mechanical pressure exerted by the pressurizable device comprising a constant initial quantity of gas during the temperature increase within the furnace and then;
  - a decrease in the temperature, the mechanical pressure exerted by the pressurizable device being maintained substantially constant by introducing additional gas during the cooling;
- the mechanical pressure is exerted on a stack of plates separated from each other by a filler material, the stack comprising an upper plate, a lower plate and at least one plate (filler material) situated between the upper plate and the lower plate, the mechanical pressure being exerted by the pressurizable device on the upper surface of the upper plate or on the lower surface of the lower plate;
- the two plates separated by the filler material are compressed by means of a plurality of pressurizable devices distributed on the surface of the plate on which mechanical pressure is exerted;
- the mechanical pressure that each pressurizable device of the plurality of pressurizable devices exerts is adjusted independently from the mechanical pressure exerted by the other pressurizable device or devices;
- the pressurizable device exerts a maximum mechanical pressure substantially equal to 6 bar;
- the two plates separated by the filler material have a surface equal to or greater than 500 cm$^2$ and preferably substantially equal to 1000 cm$^2$.

Figure 2:
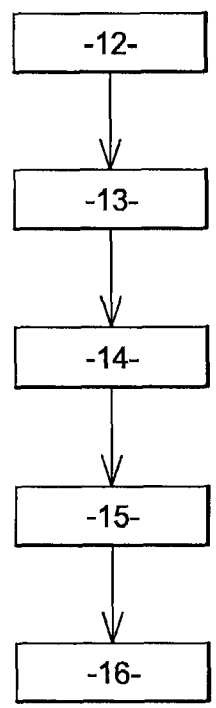
Figure 3:
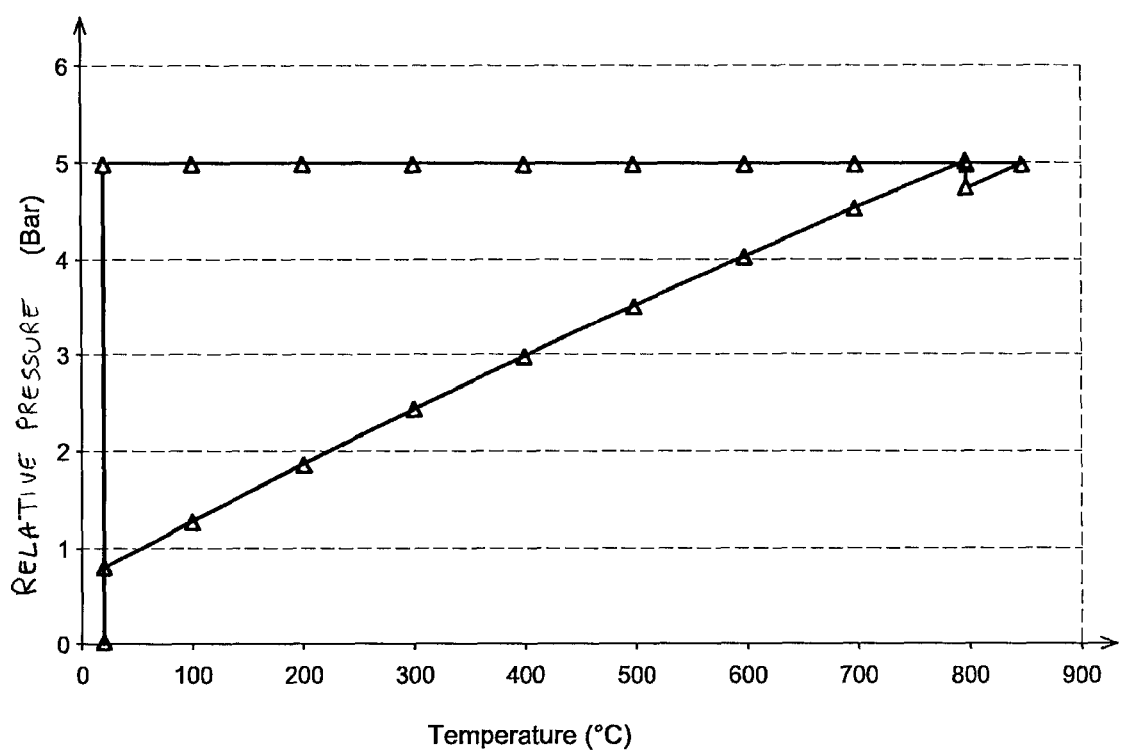

Other characteristics and advantages of the invention will clearly emerge from the description given below, for indicative and in no way limiting purposes, of embodiments referring to the attached figures in which:

FIG. 1 represents an installation for the implementation of an assembly process by brazing in conformance with the invention, FIG. 2 represents an example of implementation of the steps of the assembly process by brazing in conformance with the invention, FIG. 3 represents a curve illustrating the pressure exerted within a bellows as a function of the temperature.

For reasons of clarity, only the elements useful for understanding the invention have been represented, without respecting the scale and schematic manner.

FIG. 1 schematically illustrates an installation 1 for the implementation of an assembly process by brazing in conformance with the invention.

The installation 1 comprises:
a lower plate 6,
an upper plate 7,
stays 8,
a series of bellows 5 (here five bellows 5 are represented).

Installation 1 also comprises a layer 4 formed by a stack of plates 2 separated from each other by a filler material 3.

Enlargement A of two plates 2 separated by a brazing filler material 3, that comprises layer 4, is also represented in FIG. 1. By way of example, the two plates 2 represented here are trilayer plates, an upper layer 9, an intermediate layer 10 and a lower layer 11. The upper 9 and lower 11 layers are for example copper plates and the intermediate layer 10 is for example a stainless steel layer. The three layers 9, 10, 11 are assembled by explosion.

It will be noted that the layer 4 may comprise two bilayer (copper-stainless steel) plates, not represented, at its ends and a plurality of trilayer (copper/stainless steel/copper) plates 2 between the two bilayer endplates.

The filler material 3 inserted between plates 2 may, for example, be formed by a brazing strip in a copper alloy with a thickness of 39 um. The melting point of this filler material 3 may typically be between 780 and 900° C.

Layer 4 is positioned between the upper surface of the lower plate 6 and the lower surface of bellows 5. In other words, bellows 5 are distributed over the surface of the upper plate 2 on which each bellows 5 exerts local mechanical pressure.

Installation 1 is disposed inside a brazing furnace, not represented.

By way of non-limiting example, the bellows 5 material is a nickel alloy of the Incoloy™ 800 type having mechanical properties such as very high creep resistance and fatigue resistance at high temperatures. Bellows 5 are wave bellows; the latter may for example comprise ten waves. In general, the number of waves depends on the physical properties of the material and the work run in progress such as, for example, 10 mm. In addition, the bellows 5 comprises 5 concentric walls with a thickness of 1 mm. More particularly, the inner wall of bellows 5 serves as a leakproof container so as to be able to contain a pressurized gas. The four additional walls, that are not leakproof, ensure the mechanical resistance of the bellows 5.

For example, bellows 5 have an outer diameter of 320 mm, an inner diameter of 272 mm and a height of 280 mm. The latter may be pressurized up to 6 bar for a temperature approaching 900° C. It is understood that this pressure is given here by way of example and that it may be more or less. The pressure of bellows 5 depends on the materials that the bellows 5 compresses. In fact, the limit of the mechanical pressure exerted by bellows 5 on plates 2 depends on the plasticity of the plate 2 material. So as to not create irreversible deformations by plates 2, the mechanical pressure exerted by bellows 5 on layer 4 must not lead to plastic deformation of the materials of layer 4.

The pressure in each of the bellows 5 is adjusted by means that are not represented. These means for adjusting the pressure of each of the bellows 5 comprise:

means to introduce gas within bellows 5 to increase the pressure in the latter, means to withdraw gas from bellows 5 to reduce the pressure in the latter.

To do this, the adjustment means are, by way of an illustration, equipped with valves, of the quarter turn type (two valves for each bellows 5), calibrated valves (one calibrated valve per bellows 5) and precision pressure reducing valves equipped with pressure gauges enabling the downstream pressure to be measured. All of these elements, not represented, enable the pressure of bellows 5 to be adjusted by introducing or withdrawing gas. The pressure of each bellows 5 is adjusted independently.

It will be noted that the adjustment means are situated outside the furnace, at ambient temperature and are accessible to an operator and are therefore never subjected to the furnace temperature (850° C. maximum in the example described below). Therefore, these adjustment means are usable regardless of the maximum brazing temperature.

In general, the adjustment means adjust the pressure exerted inside each of the five bellows 5 and, as a consequence, the mechanical pressure that is exerted by the five bellows 5 on the layer 4. Each of the pressurizable bellows 5 is controlled independently from the other bellows 5.

Bellows 5 are deformable; they have an axial stroke of ±10 mm. Such a characteristic ensures permanent contact between layer 4 and bellows 5.

As a non-limiting example, the gas that is used to pressurize the bellows 5 is argon.

The assembly method by brazing in conformance with the invention using an installation such as that represented in FIG. 1 is now described in light of FIG. 2.

A first step 12 consists of positioning the layer 4 in a frame formed by the lower plate 6, the upper plate 7, stays and bellows 5. It should be noted that stays 8, in Inconel, have a significant section so as to limit stresses and hot creep.

A second step 13 consists of compressing layer 4 by means of the five bellows 5 that exert mechanical pressure on the upper surface of the upper plate of layer 4. To do this, the adjustment means introduce an initial quantity of gas inside bellows 5. Bellows 5 are, by way of example, pressurized at 0.8 bar of initial relative pressure.

A third step 14 consists of positioning the assembly comprising in particular the layer 4 compressed by the five bellows 5 inside the furnace.

In addition, it should be noted that to perform brazes under good conditions, a predefined brazing cycle must be respected.

Therefore, a fourth step 15 of the brazing method in conformance with the invention consists of increasing the furnace temperature to reach the brazing temperature.

Then, a fifth step 16 of the brazing method in conformance with the invention consists of reducing the furnace temperature and gradually introducing gas inside the bellows 5 to maintain constant the mechanical pressure exerted by bellows 5 on layer 4.

The fourth step 15 and the fifth step 16 are described in further detail in light of FIG. 3.

It should be noted that when the furnace temperature increases, the temperature of the gas inside the bellows 5 increases, generating an increase in the pressure by expansion of the gas in a constant volume (the initial quantity of gas being held constant).

As illustrated in FIG. 3, each bellows 5 is pressurized at 0.8 bar. This pressurization is performed, during one of steps 12 to 14, by the adjustment means by introducing at ambient temperature the gas inside the bellows 5.

Then in conformance with step 15, when the furnace temperature has increased, the pressure of each bellows 5 increases. Consequently, the mechanical pressure exerted by the bellows 5 on the layer 4 also increases.

Such an increase in pressure enables a sufficient mechanical pressure to be obtained when the braze melting temperature is reached and thus ensures uniform brazing on the surface of plates 2 that comprise layer 4.

When the temperature reaches 780° C., i.e., the temperature corresponding to the melting point of the filler material 3, the pressure within bellows 5 is 5 bar. Therefore, by way of an illustration, if layer 4 has, in our application, a brazing surface of 1000 cm$^2$ and as the five bellows 5 are pressurized at relative 5 bar, the pressure exerted on the layer 4 is 195 KN.

When the filler material liquefies, the layer 4 may collapse by some millimeters. The axial stroke of ±10 mm of bellows 5 compensates for this phenomenon without the mechanical pressure that bellows 5 exerts on layer 4 reducing significantly. This solution is represented in FIG. 3. In fact, when the furnace temperature reaches 780° C., the filler material 3 liquefies and the mechanical pressure exerted by bellows 5 on layer 4 reduces. Bellows 5 relax and the furnace temperature continues to increase (up to approximately 850° C.) so that the expansion of gas within bellows 5 enables a mechanical pressure of 5 bar corresponding to the mechanical pressure exerted at 780° C. to be exerted.

In general, it should be noted that the axial stroke of ±10 mm of bellows 5 enables a collapse of layer 4 to be taken into consideration and also enables the significant differential expansions appearing during the brazing cycle between the plates 2 to be brazed and the frame to be taken into consideration.

And then, in conformance with step 16, the gas is introduced (i.e., the quantity of gas with relation to the initial quantity of gas is increased) inside bellows 5 by the adjustment means when the furnace temperature reduces. This introduction of gas mitigates the reduction in gas pressure due to the lowering temperature. Therefore, the mechanical pressure exerted by bellows 5 on layer 4 remains constant during the reduction in furnace temperature until ambient temperature. Such an implementation enables the mechanical pressure exerted on layer 4 to be constantly maintained.

It should be noted that to prevent any relative displacement of plates 2, separated from each other by filler material 3, they are immobilized in translation by means of pins, not represented.

The brazing cycle described above is described by way of non-limiting example and it is understood that different brazing cycles may be carried out for the assembly method by brazing in conformance with the invention. For example, it is possible to maintain constant mechanical pressure on layer 4 during the brazing cycle. To do this, bellows 5 are pressurized, for example to 5 bar, at ambient temperature.

And then, when the furnace temperature increases, gas is withdrawn from bellows 5 by the adjustment means and conversely, when the furnace temperature reduces, gas is introduced within bellows 5 by the adjustment means. Therefore, the mechanical pressure exerted by bellows 5 on layer 4 is constant during the increase and reduction in temperature, particularly during the crucial solidification phase of the brazing material.

In summary, the assembly method by brazing according to the invention enables a controllable force to be exerted:
1. at high temperature and/or;
2. in a vacuum furnace and/or;
3. Remotely (the pressure adjustment means are situated outside the furnace).

In general, the assembly method by brazing adjusting the mechanical pressure exerted on layer 4 from the outside of the furnace guarantees continuous controlled tightening on the plates 2 to be brazed, including on large-size assemblies comprising a large number of simultaneous brazing planes, by using a plurality of bellows distributed on the upper or lower plate that are controlled independently from each other and by taking into account the differential thermal expansions between the different materials.

It should be noted that the bellows may all be identical but may also be different by having, for example, different dimensions (i.e., at least two bellows within the plurality of bellows may be different).

Each bellows may apply a different mechanical pressure on the plate. In particular, if the surface to be brazed (i.e., the surface where the filler material is located) is not uniform along the piece, each bellows (that may have different dimensions from the others) may be pressurized in gas at different values throughout the brazing procedure in order to exert a different local mechanical pressure as needed. In particular, in order to guarantee an efficient braze, the method according to the invention enables adequate local mechanical pressure to be applied at the level of two adjacent braze planes between which the filler material is located. This local pressure is often constrained by the mechanical resistance of the materials at brazing temperature.

Each bellows (or at least two bellows) may exert mechanical pressure according to different axes. The method according to the invention thus enables the brazing of assemblies comprising surfaces to be brazed that are not parallel between each other. Therefore, the method according to the invention in particular enables the brazing of complex mechanical pieces that are currently produced in several steps (a succession of temperature-staggered eutectic brazes requiring the use of brazing materials in which the variation in composition enables its melting point to be predefined). The method according to the invention enables the brazing to be performed in a single batch thanks to the use of a plurality of bellows exerting their forces in distinct directions.

The method according to the invention may be used for any applications requiring an adjustable pressure during a high-temperature brazing cycle, or immobilization to control the deformation of pieces greatly increasing in temperature, for example, any thermal treatment.

The method according to the invention may be used for example during the thermal treatment of materials, under vacuum or controlled atmosphere: This is therefore often the case during the thermal treatment carried out on multi-material plates used in complex assemblies before brazing (this is typically the case for the application described above, where the plates are copper and stainless steel-based trilayer or bilayer plates). In order to guarantee adequate grip of the fusible materials composing the brazing eutectic, a prior deoxidation of the braze may prove to be useful. This deoxidation of the brazing planes is usually carried out under controlled atmosphere (hydrogen atmosphere for example) and at high temperature (for example 500° C.). Thanks to the method according to the invention, the uncontrolled deformation of the plates forming the brazing assembly may be prevented.

The method according to the invention implements a brazing requiring:
an adjustable tightening force from the outside, that is programmable throughout the brazing procedure;
a hot utilization, regardless of the maximum temperature, only being limited by the mechanical resistance of the materials (stresses and creep) of the elements to be tightening and the pressurized devices (bellows) enabling local pressure to be generated at the appropriate time, in general when the (eutectic) brazing material is melted;
a utilization under vacuum, under atmosphere or rather under partial pressure of any gas (such as hydrogen for deoxidation of pieces).

In addition, the method according to the invention may be automatable for serial production.

In addition, it will be noted that the different pieces of equipment (bellows, means for adjusting the pressure in the plurality of bellows, stays, etc.) used for implementing the method according to the invention are completely reusable.

Even if the invention has been more specifically described in the case of mechanical pressure exerted by pressurizable devices on the upper surface of the upper plate, this pressure may also be exerted on the lower surface of the lower plate; Having part of the pressurizable devices disposed on the upper surface of the upper plate and the rest of the pressurizable devices disposed on the lower surface of the lower plate may also be envisaged.

In addition, even if the invention has been described in the context of pressure exerted on planar plates, the method according to the invention is applicable to systems having more complex non-planar surfaces (hemispherical for example), the concept of plates is to be understood as an element comprising a sufficient surface to dispose a plurality of pressurizable devices therein, each of the pressurizable devices being able to exert a localized pressure on said surface.

It is understood that the person skilled in the art is capable of carrying out different variations of the assembly method by brazing according to the invention and particularly in that relating to the means implemented to adjust the mechanical pressure exerted on layer 4 as a function of the temperature without necessarily departing from the scope of the invention.

In that capacity, even if the invention is preferentially applied to bellows, the pressurizable devices 5 may be cylinders, pistons or any other means pressurizable by means of a fluid (gas or liquid) capable of exerting mechanical pressure on a surface under the effect of its deformation, in a high-temperature environment that is remotely adjustable.

It is also understood that the plates 2 represented in FIG. 1 are given here by way of example and that they may be formed according to any technically possible combinations:
of one or more layer(s);
of one or more material(s);
of any surface.

The invention claimed is:
1. A method for assembling at least two plates by brazing, said plates being separated by a filler material arranged between said two plates, said method comprising:
placing said two plates separated by said filler material into a furnace;

compressing said two plates separated by said filler material;

controlling a temperature of said furnace according to a brazing cycle, wherein, during said compressing, said two plates separated by said filler material are compressed using a plurality of devices configured to be pressurized with a fluid, said pressurizable devices being located in said furnace and distributed across a surface in a lateral direction of one of said two plates on which each pressurizable device applies a mechanical pressure, said mechanical pressure being remotely adjusted as a function of the temperature of said furnace, said mechanical pressure exerted on the surface of one of said two plates by each of said pressurizable devices being obtained by the presence of an initial quantity of fluid within said pressurizable device, the mechanical pressure exerted increasing with the temperature in said furnace and being adjusted by changing said initial quantity of fluid within said pressurizable device by adding or withdrawing fluid, said mechanical pressure that each pressurizable device of said plurality of pressurizable devices exerts being adjusted independently from the mechanical pressure exerted by the other pressurizable device or devices, wherein each of said pressurizable devices is a bellows.

2. The method according to claim 1, wherein said fluid is a gas.

3. The method according to claim 2, wherein said brazing cycle comprises:

an increase in the temperature up to the brazing temperature, said temperature increase leading to an increase in the mechanical pressure exerted by said pressurizable devices comprising a constant initial quantity of gas during the temperature increase within said furnace and then;

a decrease in the temperature, the mechanical pressure exerted by said pressurizable devices being maintained substantially constant by introducing additional gas during the cooling.

4. The method according to claim 1, wherein said mechanical pressure is exerted on a stack of plates separated from each other by a filler material, said stack comprising an upper plate, a lower plate and at least one plate located between said upper plate and said lower plate, said mechanical pressure being exerted by said pressurizable devices on an upper surface of said upper plate or on a lower surface of said lower plate.

5. The method according to claim 1, wherein each pressurizable device exerts maximum mechanical pressure that is substantially equal to 6 bar.

6. The method according to claim 1, wherein said two plates separated by said filler material have a surface equal to or greater than 500 $cm^2$.

7. The method according to claim 1, at least two pressurizable devices exert different mechanical pressures on the surface.

8. The method according to claim 1, wherein at least two pressurizable devices exert mechanical pressure on the surface along two different axes.

9. The method according to claim 6, wherein the surface is substantially equal to 1000 $cm^2$.

* * * * *